(12) United States Patent
Abbasi et al.

(10) Patent No.: US 7,520,189 B2
(45) Date of Patent: Apr. 21, 2009

(54) GENERATOR INSPECTION ASSEMBLY

(75) Inventors: Waheed A. Abbasi, Murrysville, PA (US); Mark W. Fischer, Pittsburgh, PA (US); Mark D. Guthrie, Chester Springs, PA (US); Joshua R. Miller, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 356 days.

(21) Appl. No.: 11/589,017

(22) Filed: Oct. 27, 2006

(65) Prior Publication Data

US 2008/0098832 A1   May 1, 2008

(51) Int. Cl.
*G01M 19/00*   (2006.01)

(52) U.S. Cl. .................. 73/865.9; 348/82; 324/220

(58) Field of Classification Search ............... 73/865.9, 73/866.5; 348/82; 324/220; 322/99
See application file for complete search history.

(56) References Cited

U.S. PATENT DOCUMENTS

| 4,803,563 | A | 2/1989 | Dailey et al. |
| 4,889,000 | A | 12/1989 | Jaafar et al. |
| 4,962,660 | A | 10/1990 | Dailey et al. |
| 4,970,890 | A | 11/1990 | Jaafar et al. |
| 5,020,234 | A | 6/1991 | Alkire et al. |
| 5,164,826 | A * | 11/1992 | Dailey ........................ 348/83 |
| 5,295,388 | A * | 3/1994 | Fischer et al. ............. 73/12.09 |
| 5,365,166 | A | 11/1994 | Dailey et al. |
| 6,672,413 | B2 | 1/2004 | Moore et al. |
| 6,814,169 | B2 | 11/2004 | Moore et al. |
| 6,889,783 | B1 | 5/2005 | Moore et al. |

FOREIGN PATENT DOCUMENTS

EP          684483  A2 * 11/1995

* cited by examiner

*Primary Examiner*—Thomas P Noland

(57) ABSTRACT

An inspection system is provided for inspecting a generator including a rotor and a stator substantially surrounding the rotor. The rotor has a first end with a first circumference, and a second end with a second circumference. The inspection system includes first and second retaining rings disposed at or about the first and second ends of the rotor, and first and second motion control modules movably coupled to the first and second retaining rings. The first and second motion control modules are interconnected and guide a carriage assembly therebetween in order to perform an operation on the generator. At least one of the first and second motion control modules is structured to receive the carriage assembly and to move around the corresponding first or second circumference of the generator rotor, in order to align the carriage assembly with stator slots of the stator of the generator.

20 Claims, 8 Drawing Sheets

GENERATOR INSPECTION ASSEMBLY

BACKGROUND OF THE INVENTION

1. Field of the Invention

The invention relates generally to generators and, more particularly, to a generator inspection system capable of inspecting the components of relatively small to medium size generators, with the rotor of the generator in situ.

2. Background Information

Electrical generators are available in a range of sizes depending on the power output required for the particular application in which the generator will be employed. All generators must be routinely inspected, regardless of size, in order to, among other things, determine the integrity of the stator and the rotor, and to ensure that the performance of the generator will not be compromised in any way.

By way of example, two undesirable conditions for which generators are commonly inspected include the degradation of the insulation between the stator laminations, which can lead to shorts, and the loosening of the stator coil wedges, which are located within the slots defined by the stator and prevent the stator coils from vibrating. Defects in the insulation between stator laminations result in the formation of a conductive path through which current is induced. These damaged regions become hot spots which, if not addressed, can cause damage to adjacent insulation and iron melting. Traditionally, manual tests were performed to inspect for such conditions, wherein the rotor was removed from within the stator. Rotor removal is time-consuming and can lead to damage to the stator. The process of removing the rotor, manually performing the test, and replacing the rotor can consume several days, resulting in an extended generator downtime that imposes serious problems for those relying on operation of the generator.

More recently, generator inspection systems have been developed which are capable of inspecting the generator, for example, by conducting a visual inspection with the rotor in situ. More specifically, as disclosed, for example in U.S. Pat. No. 6,814,169, self-propelled remote-controlled inspection vehicles are known to be employed to perform a number of tasks in locations which are generally inaccessible to humans including, for example, various locations within electrical generators. Generally, such systems include a remote-controlled carriage consisting of a propulsion frame and a platform attached to the frame. The platform is structured to carry a plurality of different interchangeable accessories (i.e., inspection equipment such as cameras and sensors, and electric motors). See also, U.S. Pat. Nos. 4,803,563; 4,889,000; 4,962,660; 4,970,890; 5,020,234; and 5,365,166.

FIGS. 1 and 2 show one example of an inspection system 2 used to inspect relatively large (e.g., about 100 Megawatts or more) generators, such as the turbine generator 4, which is partially shown. The system 2 includes a computer and video system 6 connected via cables 8,10 to carriage 12. The carriage 12 is movably mounted on an indexer plate assembly 14. A tangential drive motor 16 drives the carriage 12 to the desired lateral position between the rotor 18 and stator 20. In FIGS. 1 and 2, the carriage 12 is shown engaged with teeth 22 of stator 20. Coil 24 is mounted between stator teeth 22 and includes laminates 25. A single indexer assembly 26 is coupled at or about one end of the generator rotor 18 and includes sprockets 28 (best shown in FIG. 2). The indexer assembly 26 rides on chains 30 to move the indexer plate assembly 14 around the circumference of the rotor 18, along retaining ring 32. Once positioned at the desired location, the carriage 12 is unilaterally inserted and withdrawn from only one end of the generator rotor 18, where the single indexer assembly 26 is mounted. Electrical, video and control signals are transmitted to and from the computer and video system 6 (FIG. 1) to indexer 26 and carriage 12 via the cables 8,10 (FIG. 1).

Although this approach has worked reasonably well for such large generators where the minimum passage (e.g., without limitation, the air gap between the rotor and stator) through which the inspection vehicle or carriage must pass is typically greater than about 0.75 inches (1.91 centimeters), the relatively bulky nature of the configuration and required components (e.g., without limitation, internal motors and self-propelling drive components) of known remote-controlled inspection vehicles generally inhibits their ability to pass through smaller openings (i.e., less than about 0.75 inches (1.91 centimeters) and thus to inspect smaller generator units (i.e., less than about 100 Megawatts), without first requiring the disassembly of the generator. In addition to the small passages within relatively small generators, the general configuration of such generators includes, for example, bends, offsets, and other locations which must be inspected but which cannot accommodate the aforementioned inspection equipment. It is difficult for proper alignment to be achieved and maintained with respect to such small generators with the carriage 12 being inserted and withdrawn from the single indexer assembly 26 mounted at only one end of the generator rotor 18.

There is a need, therefore, for an inspection system capable of effectively inspecting generators, such as relatively small (i.e., less than about 100 Megawatts) generators, without first requiring disassembly thereof.

There is, therefore, room for improvement in generator inspection systems.

SUMMARY OF THE INVENTION

These needs and others are met by embodiments of the invention which are directed to a generator inspection system employing a pair of motion control modules at opposite ends of the generator rotor, and a reduced-size carriage assembly which travels therebetween, in order to inspect relatively small (e.g., less than about 100 Megawatts) generators with the rotor of the generator in situ.

As one aspect of the invention, an inspection system is provided for inspecting a generator including a rotor and a stator substantially surrounding the rotor. The rotor has a first end with a first circumference, and a second end with a second circumference, and the stator includes a plurality of stator slots. The inspection system comprises: a first retaining ring structured to be disposed at or about the first end of the rotor; a second retaining ring structured to be disposed at or about the second end of the rotor distal from the first retaining ring; a first motion control module movably coupled to the first retaining ring; a second motion control module movably coupled to the second retaining ring, such second motion control module being interconnected (e.g., by a cable assembly) with the first motion control module; electrical equipment; and a carriage assembly structured to transport at least some of the electrical equipment within the generator and between the first motion control module and the second motion control module, in order to perform an operation on the generator. The first motion control module and the second motion control module are structured to receive the carriage assembly and to move around a corresponding one of the first circumference of the first end of the rotor and the second circumference of the second end of the rotor, respectively, in order to align the carriage assembly with a predetermined one of the stator slots of the stator of the generator.

The carriage assembly may comprise: a body including a first end, a second end, a first side, a second side, a top, and a bottom; a nose assembly pivotably coupled to the first end of the body; a tail pivotably coupled to the second end of the body; and a track assembly coupled to at least one of the first side of the body and the second side of the body. The body may further comprise a slot guide coupled to one of the top of the body and the bottom of the body, wherein when the carriage assembly is inserted into the predetermined one of the stator slots, the slot guide engages the predetermined one of the stator slots in order to maintain the carriage assembly in proper alignment with respect to the predetermined one of the stator slots as the carriage assembly moves therethrough.

The nose assembly may comprise a nose member and camera assembly, wherein the nose member includes a first side, a second side, and a number of drive shafts extending between the first side and the second side, and wherein the camera assembly is movable back and forth on the drive shafts between the first side of the nose member and the second side of the nose member. The camera assembly may comprise: a first case, a number of cameras and at least one illuminating device disposed on and supported by the first case, a motor including at least one gear which turns around the drive shafts of the nose member, in order to move the camera assembly back and forth thereon, and a second case coupled to the first case, the second case being structured to secure and protect at least one of the cameras, the at least one illuminating device, and the motor. The cameras may comprise a first camera disposed at or about a first end of the first case of the camera assembly, in order to view in front of the carriage assembly, and a second camera and a third camera disposed toward the opposite end of the first case of the camera assembly, wherein the second camera and the third camera are structured to view above and below the carriage assembly, respectively. The illuminating device may comprise a plurality of Light Emitting Diodes (LEDs) coupled to the first case of the camera assembly proximate each of the first camera, the second camera, and the third camera. The nose assembly may further comprise an Electromagnetic Core Imperfection Detector (ELCID) holder structured to removably receive a ELCID coil. The carriage assembly may include a side profile having a height, wherein the height of the side profile of the carriage assembly is less than about 0.75 inches.

The track assembly may comprise: a number of track hinges pivotably coupled to the body of the carriage assembly, a number of gears coupled to the track hinges, and at least one tread coupled to the gears. The tread is structured to grip the generator, and the gears are structured to rotate, thereby turning the tread in order to facilitate movement of the carriage assembly through the generator. The track assembly may further comprise a number of magnets structured to attract the track assembly and the carriage assembly to the generator.

At least one of the first motion control module and the second motion control module may comprise: a docking cart including a frame structured to receive the carriage assembly and to move the carriage assembly about the corresponding one of the first circumference of the first end of the rotor on the first retaining ring and the second circumference on the second retaining ring of the second end of the rotor, respectively, a number of motors coupled to the frame of the docking cart, a guide assembly for guiding the carriage assembly into the docking cart, a plurality of wheels for facilitating movement of the docking cart about the corresponding one of the first circumference and the second circumference, a transverse transport assembly for moving the carriage assembly back and forth between the first motion control module and the second motion control module, and a radial transport assembly for moving the carriage assembly around the corresponding one of the first circumference and the second circumference of the first end and the second end of the rotor of the generator rotor, respectively.

The frame of the docking cart may include a first side, a second side, a first end, and a second end, wherein the wheels comprise a plurality of lateral wheels coupled to the first side and the second side of the frame of the docking cart, and a number of guide members coupled to the second end of the frame of the docking cart, and wherein the lateral wheels and the guide members are adjustable with respect to the frame of the docking cart in order to accommodate the corresponding one of the first circumference and the second circumference of the first end and the second end of the rotor of the generator. The guide assembly of the docking cart may comprise a slide coupled to the frame of the docking cart, and a catch coupled to the slide at or about the second end of the frame of the docking cart, wherein the slide permits the carriage assembly to smoothly transition from the generator into the frame of the docking cart, and wherein the catch receives the tail of the carriage assembly in order to guide the carriage assembly into proper alignment within the frame of the docking cart.

The transverse transport assembly may comprise: a first motor coupled to the frame of the docking cart and including a spool and a clutch, and at least one cable extending between the first motion control module and the second motion control module. Such cable may be coupled at one end to the spool and at the other end, to the carriage assembly. The clutch of the first motor may be operable between an engaged mode corresponding to the first motor turning the spool and winding the at least one cable, and a disengaged mode in which the spool is free to rotate independent from the first motor. When the clutch of the first motor of one of the first motion control module and the second motion control module is in the engaged mode, the clutch of the first motor of the other motion control module is in the disengaged mode, in order that the transverse transport assembly moves the carriage assembly toward the motion control module which has the clutch in the engaged mode.

The radial transport assembly may comprise: a number of first sprockets pivotably coupled to the first side of the frame of the docking cart, a number of second sprockets pivotably coupled to the second side of the frame of the docking cart, a chain engaging and extending between the first sprockets and the second sprockets, and around the corresponding one of the first circumference of the first end of the generator rotor and the first retaining ring, and the second circumference of the second end of the generator rotor and the second retaining ring, a second motor including a drive shaft coupled to one of the first sprockets and the second sprockets in order to pivot the one of the first sprockets and the second sprockets, thereby turning the chain and moving the docking station and the carriage assembly received therein, around the corresponding one of the first circumference of the first end of the generator rotor and the first retaining ring and the second circumference of the second end of the generator rotor and the second retaining ring.

At least one of the first motion control module and the second motion control module may further comprise at least one of an encoder assembly for the transverse transport assembly, and inclinometer for the radial transport assembly, wherein the encoder assembly is structured to determine the distance of the carriage assembly from the at least one of the first motion control module and the second motion control module, in order to determine the location of the carriage assembly within the generator, and wherein the inclinometer is structured to determine the position of the at least one of the first motion control module and the second motion control module on the corresponding one of the first circumference of the first end of the generator rotor and the second circumference of the second end of the generator rotor.

The electrical equipment employed by the generator inspection system may be selected from the group consisting of cameras, ELCID coils, LEDs, motors, sensors, and transmitters. The operation performed on the generator may include at least one of: (a) an inspection of at least the predetermined one of the stator slots of the stator of the generator, and (b) an analysis of the iron core of the generator. The generator inspection system may also include a controlling and monitoring station which is in electrical communication with the first motion control module, the second motion control module, and the carriage assembly, in order to perform the operation on the generator from a remote location.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
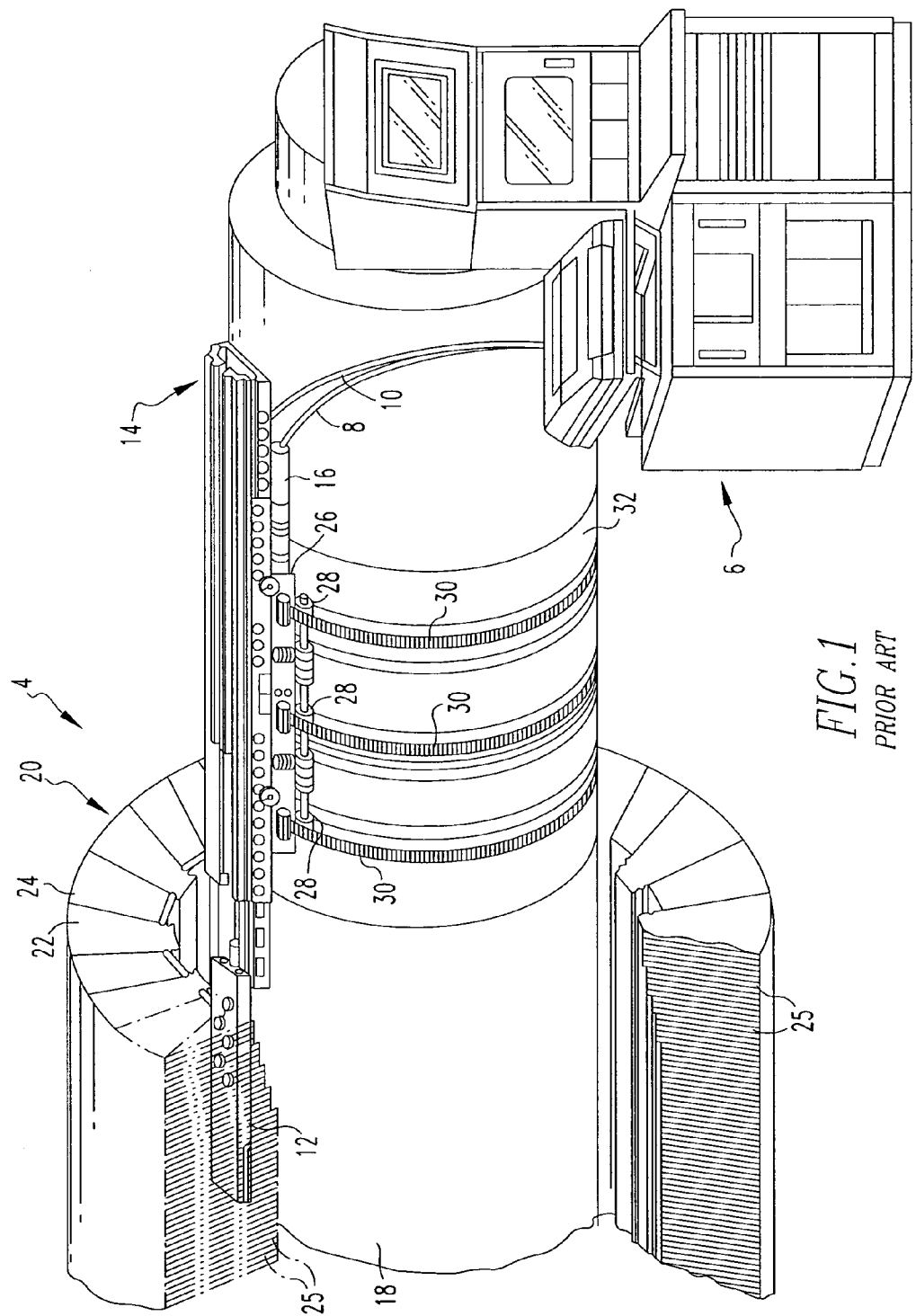
FIG. 1 is an isometric view of a generator and inspection system therefor.

Embodiments of the invention will be described as applied to inspection of relatively small (e.g., less than about 100 Megawatts) electrical generators, although it will become apparent that they could also be applied to perform a wide variety of operations (e.g., without limitation, testing; repair; replacement of parts) on any known or suitable power generation equipment expressly including, but not limited to, large (e.g., about 100 Megawatts or more) generators.

Directional phrases used herein, such as, for example, upper, lower, top, bottom, front, back, clockwise, counterclockwise and derivatives thereof, relate to the orientation of the elements in the drawings and are not limiting upon the claims unless expressly recited therein. It is also to be understood that the specific elements illustrated in the drawings and described in the following specification, are simply illustrative of exemplary embodiments of the invention. Therefore, specific dimensions, orientations and other physical characteristics related to the embodiments disclosed herein are not to be considered limiting unless expressly stated to the contrary.

As employed herein, the term "sensor" refers to any known or suitable device for collecting data from the generator in accordance with embodiments of the invention and expressly includes, but is not limited to, thermal sensors (i.e., thermocouples), optical sensors (i.e., photo eyes; cameras), pressure sensors (i.e., pressure transducers), ELCID (Electromagnetic Core Imperfection Detector) coils, position sensors, and speed sensors.

As employed herein, the statement that two or more parts are "coupled" together shall mean that the parts are joined together either directly or joined through one or more intermediate parts.

As employed herein, the term "number" shall mean one or an integer greater than one (i.e., a plurality).

A continual goal with respect to servicing (e.g., inspecting; repairing; maintaining) power generation equipment, such as the generators of power generation systems, is to improve overall efficiency by performing service tasks faster and more effectively, and thereby reduce the equipment outage time (i.e., down time) required to perform such tasks. Generator inspection is essential to determine the integrity of the core iron and the stator and the rotor of the generator, and to thus ensure that the performance of the generator will not be compromised in any way. To accomplish this goal, particularly with respect to relatively small (e.g., about 100 Megawatts or less) generators, a new generator inspection system capable of performing thorough inspections with the rotor of such generators in situ, is required. Such a system is provided by embodiments of the invention, which will now be discussed.

Figure 3:
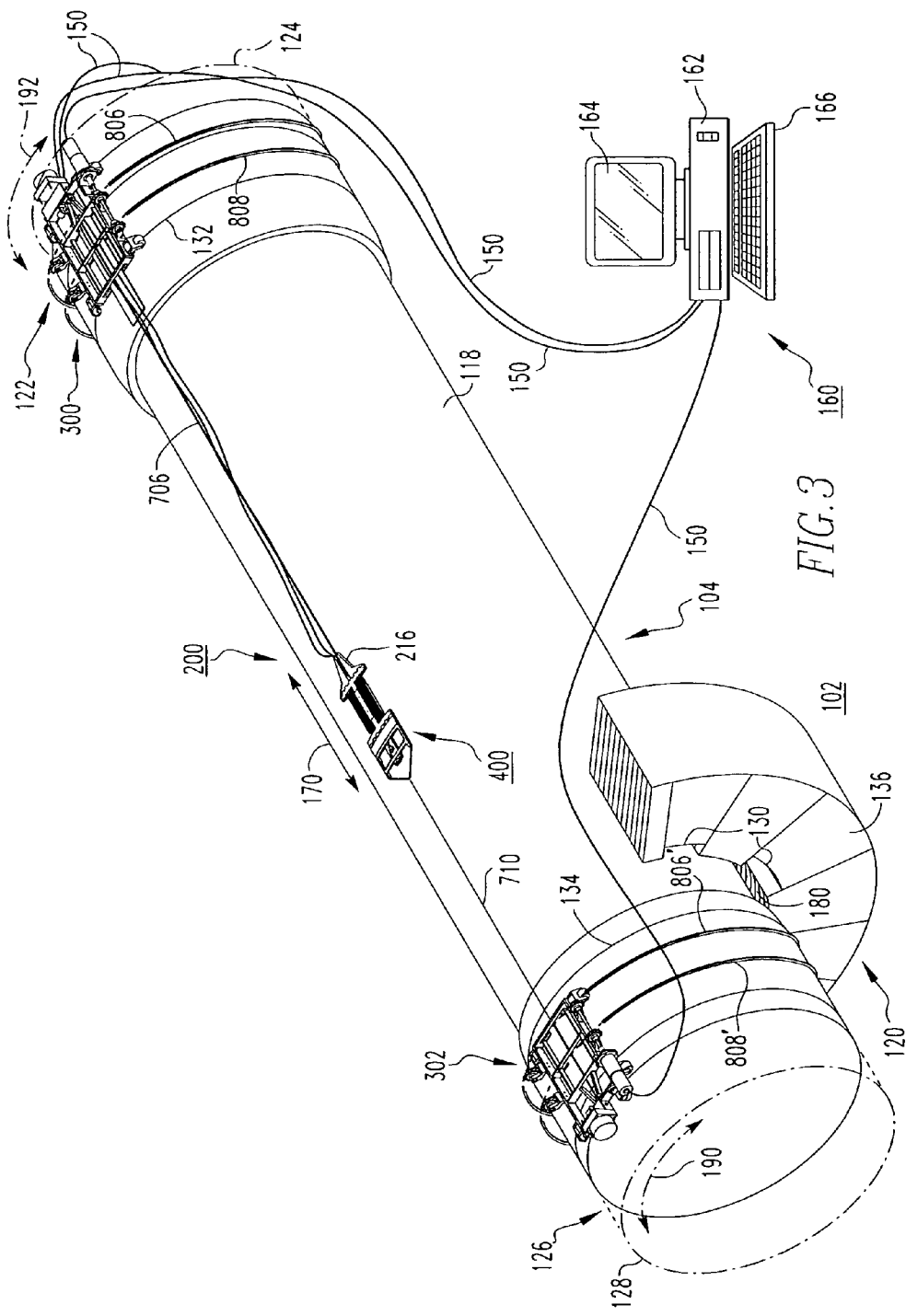
FIG. 3 is an isometric view of a portion of a generator and a generator inspection system in accordance with an embodiment of the invention.

FIG. 3 shows an inspection system 102 including a carriage assembly 200 and two motion control modules 300,302 for inspecting a generator 104 (partially shown in simplified form). The generator 104 includes a rotor 118 and a stator 120 (partially shown), which substantially surrounds the rotor 118. The rotor 118 has a first end 122 with a first circumference 124, and a second end 126 with a second circumference 128. The stator 120 includes a plurality of stator slots 130. The generator 104 also includes an iron core (generally indicated by reference numeral 136 in FIG. 3).

In the example of FIG. 3, the first and second circumferences 124,128 of the first and second ends 122,126 of the rotor 118 are substantially the same, although it will be appreciated that the inspection system 102 of the invention could also be employed where the circumferences of the first and second ends 122,126 of the generator rotor 118 are different. It will also be appreciated that although the inspection system 102 is contemplated as including a controlling and monitoring station 160 which is electrically connected to components (e.g., first and second motion control modules 300,302; carriage assembly 200) by power cables 150, that electrical communication could alternatively be provided between such components and the controlling and monitoring station 160 via wireless communication, for example, between a transmitter (not shown), such as, for example and without limitation, a radio frequency (RF) transceiver, of the carriage assembly 200 and the controlling and monitoring station 160. Regardless of the particular configuration, the inspection system 102 and the controlling and monitoring station 160 thereof, provide a mechanism for performing an operation on the generator 104 from a remote location. It will also be appreciated that the controlling and monitoring station 160 may include any known or suitable components for controlling and monitoring the inspection system 102 and/or recording data retrieved thereby, such as, for example and without limitation, the computer 162 and display 164, control panel 166 and memory thereof, which are shown in FIG. 3.

The inspection system 102 includes a first retaining ring 132 structured to be disposed at or about the first end 122 of rotor 118 of the generator 104, a second retaining ring 134 disposed at or about the second end 126 of the rotor 118, distal from the first retaining ring 132. The first and second retaining rings 132,134 extend around the first and second circumferences 124,128 of the first and second ends 122,126, respectively. The first control module 300 is movably coupled to the first retaining ring 132, and the second motion control module 302 is movably coupled to the second retaining ring 134 and interconnected with the first motion control module 300, as shown. In the example of FIG. 3, the first and second motion control modules 300,302 are interconnected by way of a pair of cables 706,710. It will, however, be appreciated that any known or suitable mechanism (not shown) could be alternatively employed to interconnect the modules 300,302, without departing from the scope of the invention.

As will be shown and described hereinbelow with reference to FIGS. 3-7, the inspection system 102 further includes electrical equipment (e.g., without limitation, ELCID (Electromagnetic Core Imperfection Detector) coils 140; power cables 150; controlling and monitoring equipment 160; motors 308,310,612; cameras 604,606,608; illuminating devices 610; sensors; transmitters), and the aforementioned carriage assembly 200, which is structured to transport at least some of the electrical equipment within the generator 104 in between the first and second motion control modules 300,302, as indicated by arrow 170 of FIG. 3, in order to perform an operation on the generator 104. It will be appreciated that such operation may include, for example and without limitation, inspection of one or more of the stator slots 130 of the stator 120 of the generator 104, and/or an analysis of the iron core 136 of the generator 104. As will be discussed in detail hereinbelow, at least one of the first and second motion control modules 300,302 (i.e., first motion control module 300 in the example shown) of the inspection system 102 in accordance with embodiments of the invention, is structured to receive the carriage assembly 200, in order to move around the first and second circumferences 124,128 of the first and second ends 122,126 of the generator rotor 118 and retaining rings 132,134, respectively, and thereby align the carriage assembly 200, for example, with a predetermined one of the stator slots 130 of the stator 120 of the generator 104. Then, once the carriage assembly 200 and the first and second motion control modules 300,302 have been properly aligned, the control modules 300,302 are actuated to pull the carriage assembly 200 through the generator 104 from one motion control module 300 to the other, using the aforementioned cable 706, to perform the desired operation.

Figure 4:
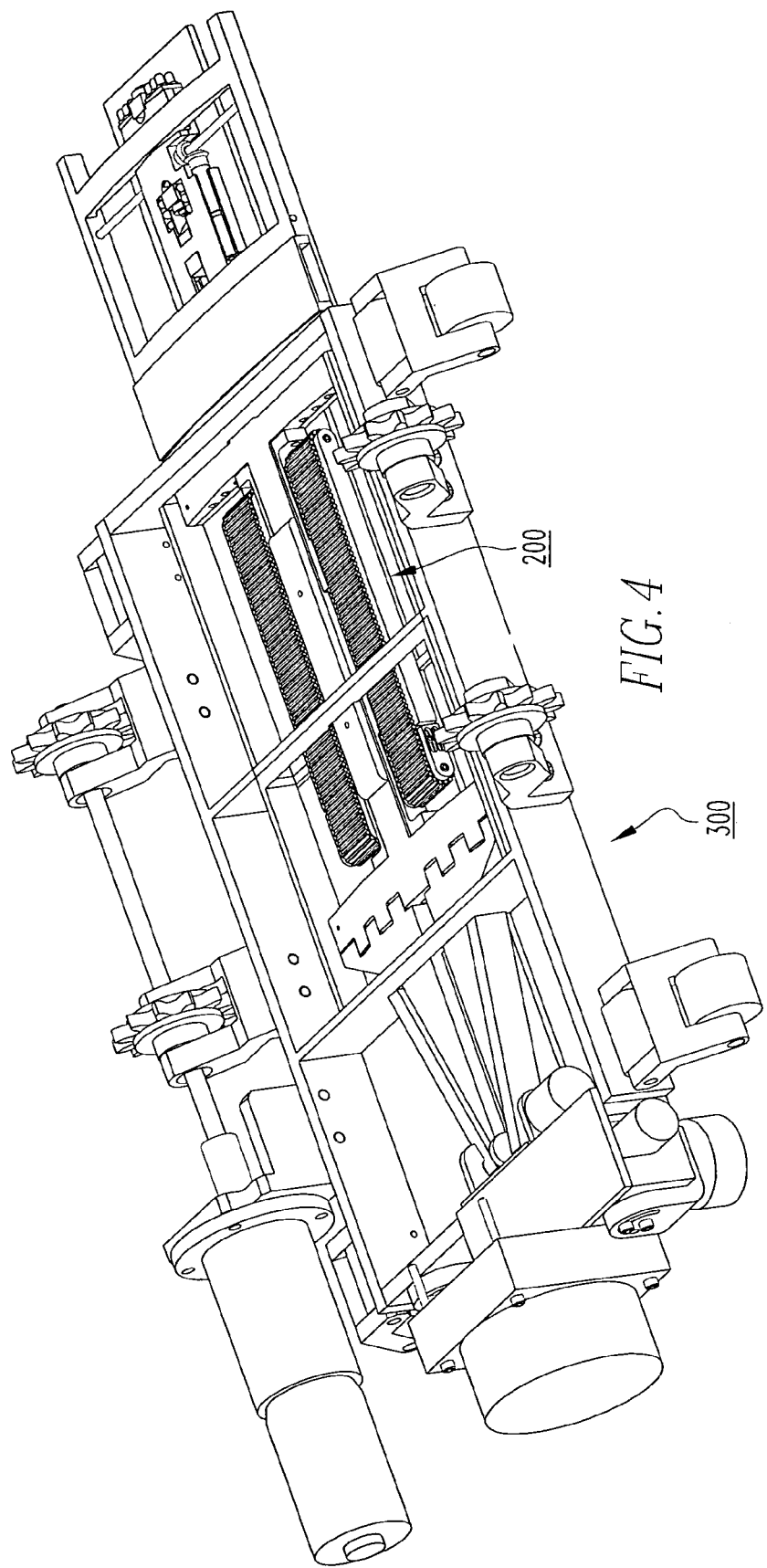
FIG. 4 is an isometric view of one of the motion control modules and the carriage assembly of the generator inspection system of FIG. 3.

FIG. 4 shows the carriage assembly 200 docked within one of the aforementioned motion control modules, 300, specifically the first motion control module ready for transport radially around the corresponding first circumference 124 (FIG. 3) of the rotor 118 (FIG. 3) and retaining ring 132 (FIG. 3) to the next desired location. For simplicity of disclosure, only one of the motion control modules, 300, will be shown and described hereinbelow. It will, however, be appreciated that the components of the second motion control module 302 are substantially similar.

Figure 5A:
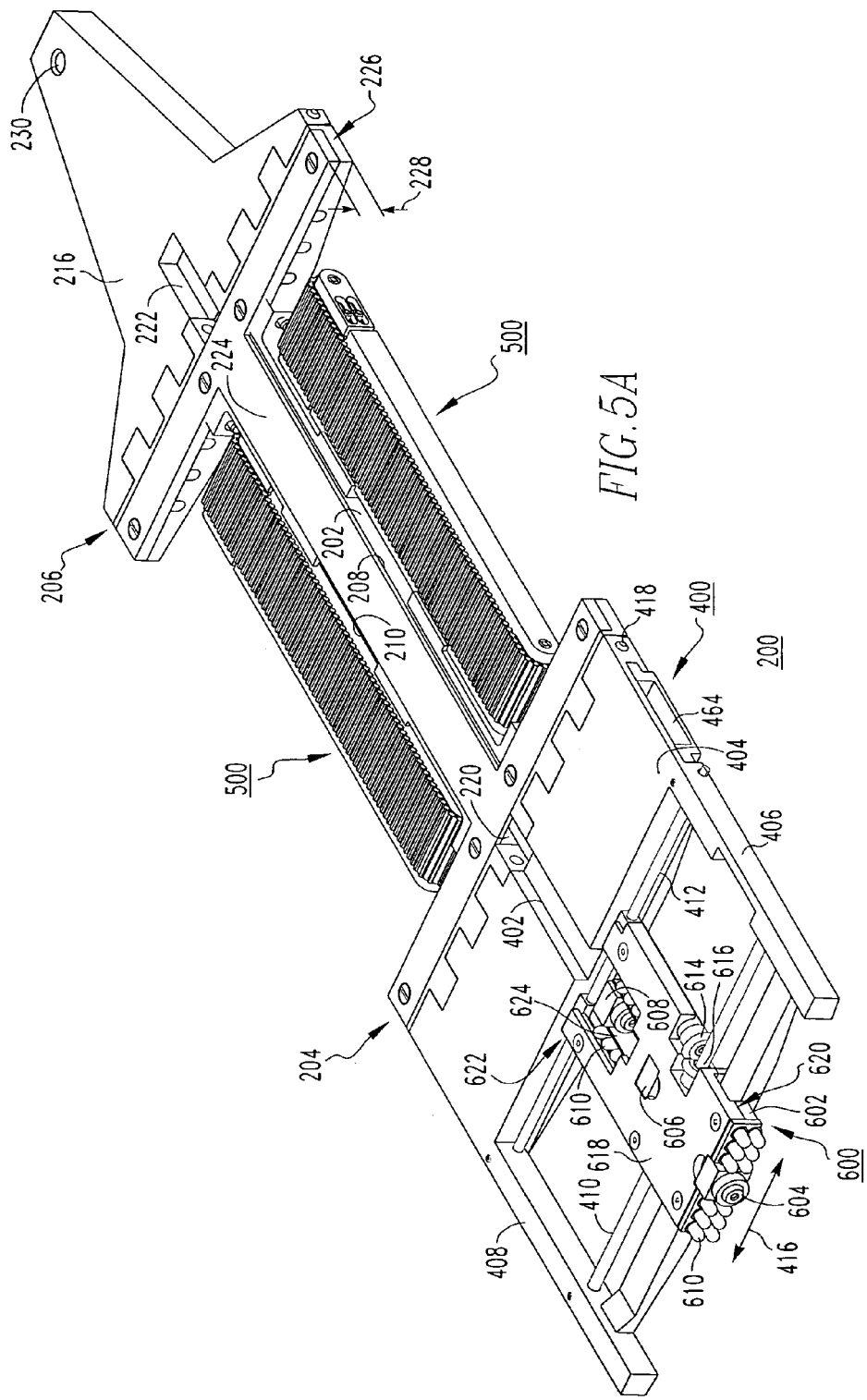
FIGS. 5A and 5B are assembled isometric and exploded isometric views, respectively, of the carriage assembly of FIG. 4.
Figure 5B:
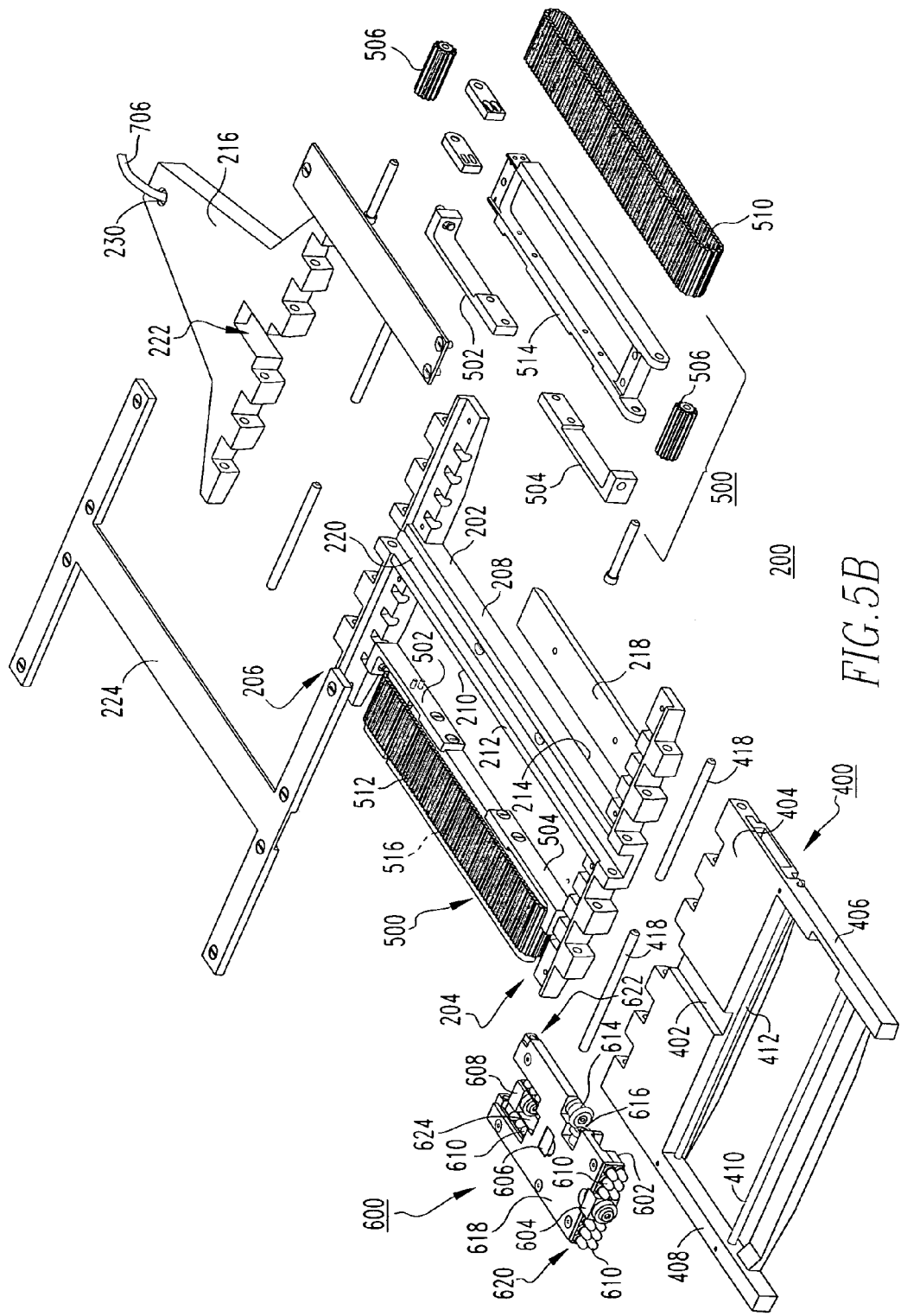

FIGS. 5A and 5B show the components of the carriage assembly 200. Specifically, the carriage assembly 200 includes a body 202 having a first end 204, a second end 206, a first side 208, a second side 210, a top 212 (FIG. 5B), and a bottom 214 (FIG. 5B). A nose assembly 400 pivotably couples to the first end 204 of the body 202 using any known or suitable pivotable connecting mechanism such as, for example and without limitation, one or more pivot pins 418. A tail 216 is similarly coupled to the second end 206 of the body 202, and a track assembly 500 is coupled to at least one of the first and second sides 208,210 of the body 202. The track assembly 500 of the exemplary carriage assembly 200 is coupled to both the first and second sides 208,210. The body 202 of the carriage assembly 200 further includes a slot guide 218 (FIG. 5B) which is coupled to one of the top 212 of the body 202 and the bottom 214 of the body 202, as shown. The slot guide 218 engages the predetermined one of the stator slots 130 (FIG. 3), previously discussed, and functions to maintain the carriage assembly 200 in proper alignment with respect to the stator slot 120 (FIG. 3) as a carriage assembly 200 moves therethrough.

Power is supplied to at least some of the electrical equipment which is transported by the example carriage assembly 200 by way of the power cables 150, previously discussed with respect to FIG. 3. To accommodate the power cables 150 (FIG. 3) and house them out of the way, for example, of the track assembly 500 of the carriage assembly 200, at least one of the body 202 of the carriage assembly 200, the nose assembly 400 of the carriage assembly 200, and the tail 216 of the carriage assembly 200 includes a groove. In the example of FIGS. 5A and 5B, the body 202 of the carriage assembly 200, the nose assembly 400, and the tail 216 all include a groove 220,402,222, respectively structured to receive the power cables 150 (FIG. 3). A cover 224 of the carriage assembly 200 is suitably fastened to the body 202 of the carriage assembly 200, in order to secure and maintain the power cables 150 within the grooves 220,402,222, with the power cables 150 extending out of the tail 216 of the carriage assembly 200 so as not to impede motion thereof, as shown in FIG. 3.

Figure 6:
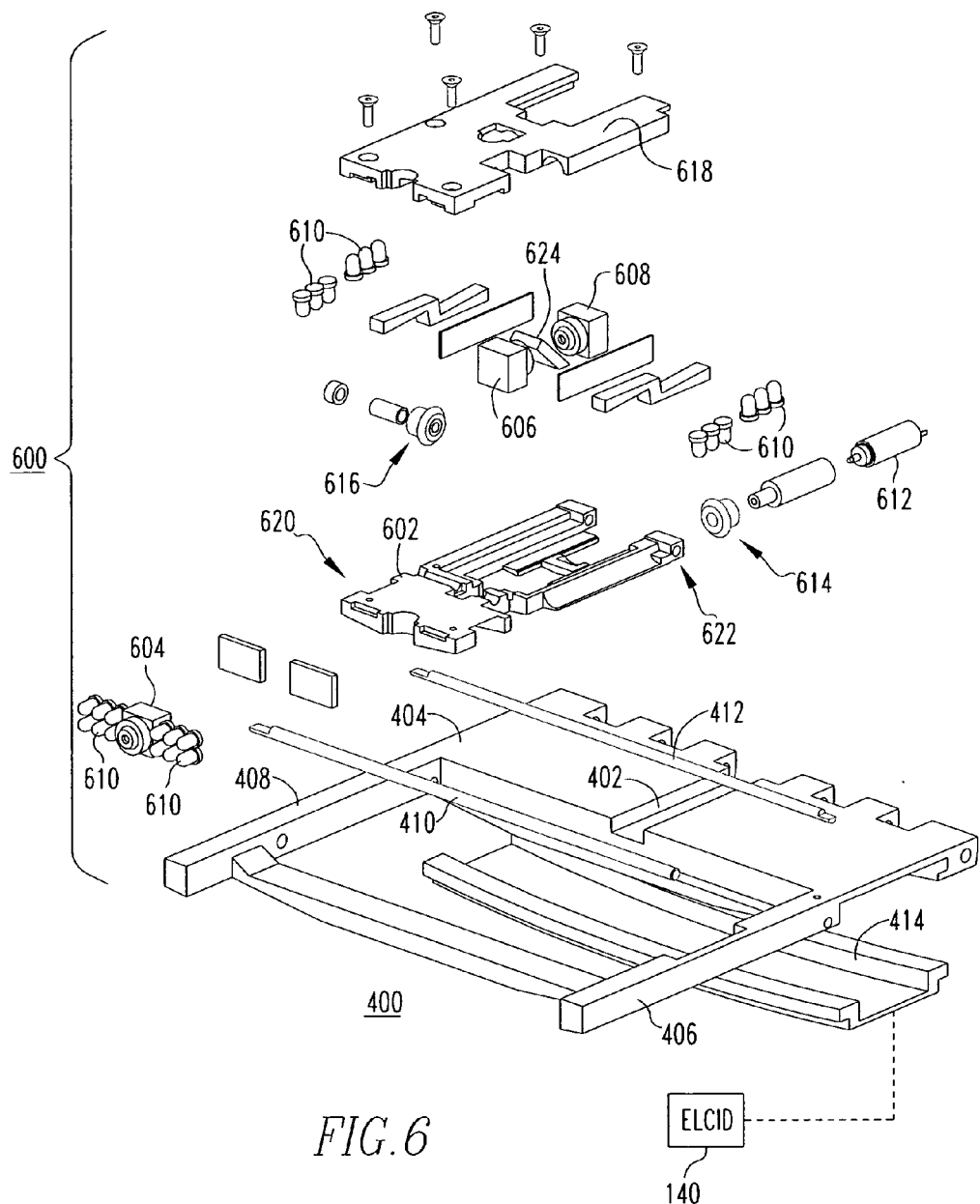
FIG. 6 is an exploded isometric view of the nose assembly and camera assembly therefor of the carriage assembly of FIG. 4.

As shown in FIG. 6, the nose assembly 400 of the carriage assembly 200 (FIGS. 3, 4, 5A and 5B) includes a nose member 404 and a camera assembly 600. The nose member 404 includes a first side 406, a second side 408, and a number of drive shafts 410,412 extending between the first side 406 and the second side 408. Two drive shafts 410,412 are provided in the example of FIG. 6. The camera assembly 600 is coupled to the drive shafts 410,412 and is movable back and forth thereon between the first and second sides 406,408 of the nose member 404 in the direction generally indicated by arrow 416 of FIG. 5A. In this manner, the camera assembly 600, which will now be described in greater detail, can be manipulated, as desired, within the generator 104 in order to view the desired section thereof.

More specifically, the camera assembly 600 includes a first case 602, and a number of cameras 604,606,608 and at least one illuminating device 610 disposed on and supported by the first case 602. A motor 612 includes at least one gear, such as the pair of gears 614,616, shown, which turn, in order to move the camera assembly 600 back and forth on the drive shafts 410,412 of the nose member 404, as previously described. A second case 618, is coupled to the first case 602 and is structured to secure and protect at least one of the cameras 604, 606,608, the illuminating devices 610, and the motor 612. The exemplary camera assembly 600 includes three cameras, a first camera 604 disposed at or about the first end 620 of the first case 602, in order to view in front of the carriage assembly 200, and second and third cameras 606,608 disposed toward the opposite end 622 of the first case 602. The second and third cameras 606,608 are arranged to view above and below (from the perspective of FIG. 5A) the carriage assembly 200 (best shown in FIG. 5A), respectively. More specifically, the second and third cameras 606,608 are disposed on the first case 602 of the camera assembly 600 facing one another, with a mirror 624 disposed therebetween. The mirror 624 is angled in order that a portion of the generator 104 (FIG. 3) above the camera assembly 600 is reflected and viewed by the second camera 606, and a portion of the generator 104 (FIG. 3) below the camera assembly 600 is reflected by the mirror 624 and viewed by third camera 608. The illuminating device of the exemplary camera assembly 600 includes a plurality of LEDs (light emitting diodes) 610 coupled to the first case 602 of the camera assembly 600 proximate each of the first, second and third cameras 604,606,608, in order to illuminate the portions of the generator 104 (FIG. 3) which are respectively viewed thereby.

As previously noted, the electrical equipment which is transported by the exemplary carriage assembly 200 includes an ELCID coil 140 (shown in simplified form in FIG. 6) which is employed to test and analyze the iron core 136 (FIG. 3) of the generator 104 (FIG. 3). Accordingly, the nose assembly 400 of the example carriage assembly 200 further includes an ELCID holder 414, which is structured to removably receive the ELCID coil 140, and to transport the coil 140, which is shown in simplified form and generally indicated by numeral 140 in FIG. 6, into and out of the generator 104 (FIG. 3).

Referring again to FIG. 5B, the exemplary track assembly 500 includes a number of track hinges 502,504 for pivotably coupling the track assembly 500 to the body 202 of the carriage assembly 200, a number of gears 506,508 coupled directly or indirectly to the track hinges 502,504, and at least one tread 510,512 coupled to the gears 506,508. The example track assembly 500 includes a pair of treads 510,512 each coupled to gears 506,508. The treads 510,512 function to grip the generator 104 (FIG. 3) as the gears 506,508 rotate, thereby turning the treads 510,512 and facilitating movement of the carriage assembly 200 through the generator 104 (FIG. 3). The track assembly 500 preferably further includes a number of magnets 514,516 which are structured to attract the track assembly 500 and thus the carriage assembly 200, to the iron core 136 (FIG. 3) of the generator 104 (FIG. 3).

Figure 2:
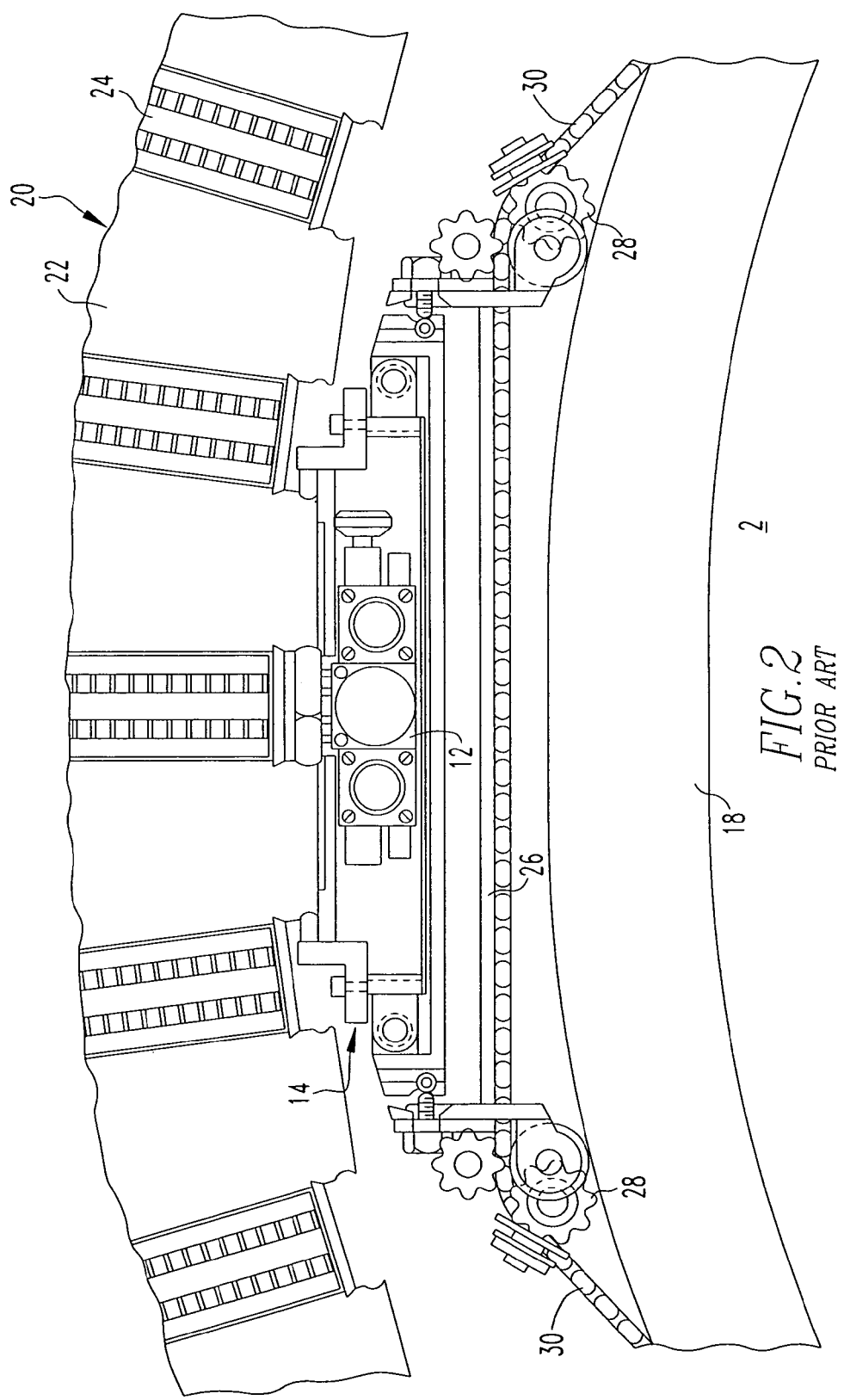
FIG. 2 is an end elevational view of the generator and inspection system therefor of FIG. 1, with the carriage assembly of the inspection system shown engaging the stator of the generator.

An important aspect of the inspection system 102 in accordance with embodiments of the invention, which is best shown in FIG. 5A, is the fact that the carriage assembly 200 of the inspection system 102 includes a side profile 226 having a height 228 which is significantly less than known inspection vehicles (e.g., without limitation, carriage 12 of inspection system 2 of FIGS. 1 and 2). More specifically, the height 228 of the side profile 226 of the example carriage assembly 200 is preferably less than about 0.75 inch and more preferably, from about 0.4 inch to about 0.5 inch, whereas, for example, the height of the profile of the carriage 12 of FIGS. 1 and 2, is greater than 0.75 inch. This aspect of the inspection system 102 permits the carriage assembly 200 to fit within sections (e.g., gap 180 between rotor 118 and stator 120 of FIG. 3) of the generator 104 which previously could not be reached by the larger carriage designs of known inspection systems (e.g., inspection system 2 of FIGS. 1 and 2). It also permits smaller (e.g., less than about 100 megawatts) generators 104 to be inspected, without first requiring the rotor 118 of the generator 104 to be removed. Thus, the inspection system 102 in accordance with embodiments of the invention provides vast time and cost savings over known inspection systems and associated methods.

Figure 7:
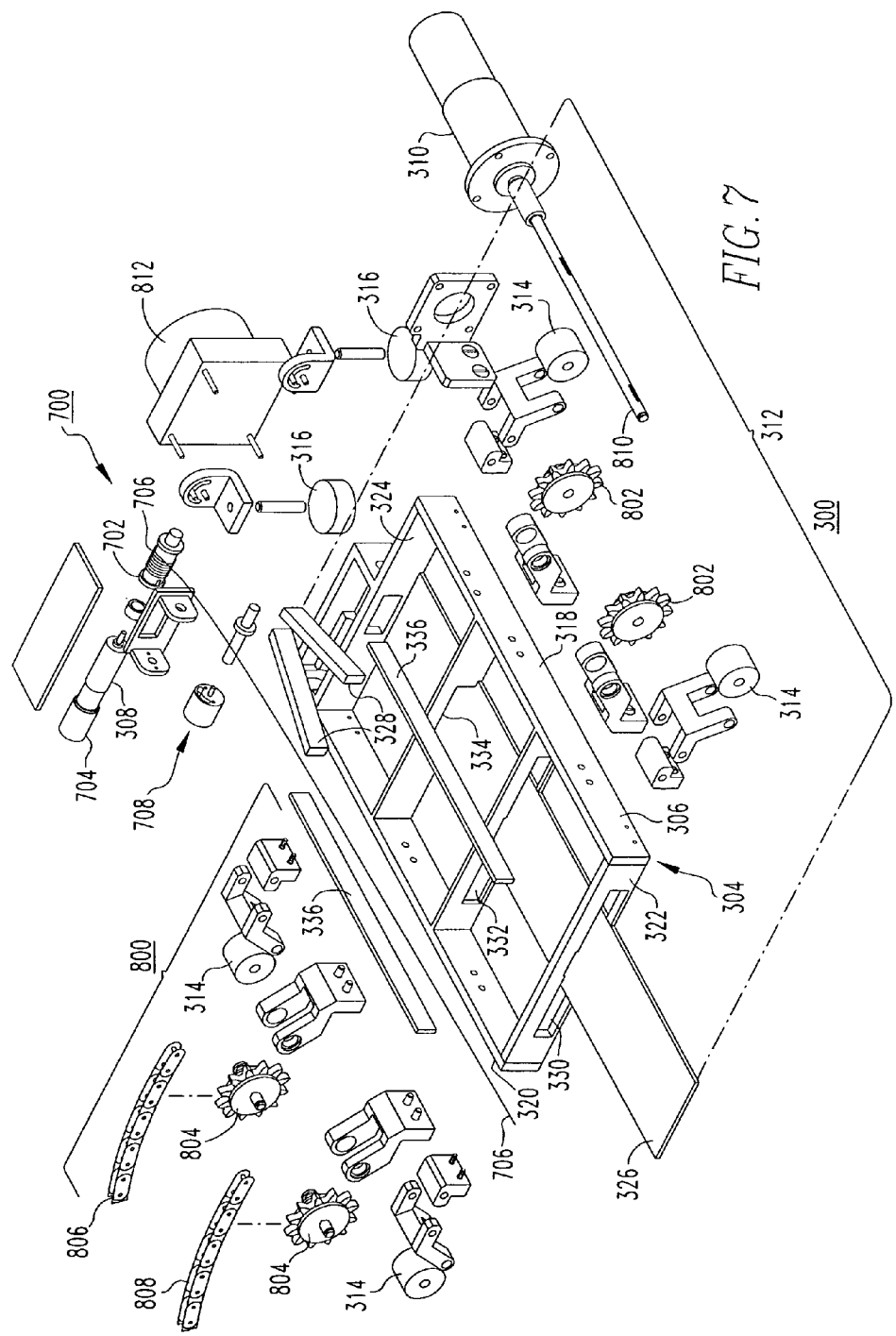
FIG. 7 is an exploded isometric view of the motion control module of FIG. 4.

FIG. 7 shows the components of the first motion control module 300 of the generator inspection system 102 (FIG. 3), in greater detail. As previously noted, it will be appreciated that the components of the second motion control module 302 (FIG. 3) are substantially the same, except as expressly stated hereinbelow. Specifically, the motion control module 300 includes a docking cart 304 including a frame 306 which is structured to receive the carriage assembly 200, as shown in FIG. 4, and to move the carriage assembly 200 about the corresponding one of the first and second circumferences 124,128 (FIG. 3) on the corresponding retaining ring 132,134 (FIG. 3) of the first or second end 122,126 (FIG. 3) of the generator rotor 118 (FIG. 3). The exemplary second motion control module 302 (FIG. 3) is not structured to receive the carriage assembly 200 (FIGS. 3 and 4). A number of motors 308,310 are coupled to the frame 306 of the docking cart 304 in order to facilitate such movement, in addition to the movement of the carriage assembly 200 (FIGS. 3, 4, 5A and 5B) back and forth between the first and second motion control modules 300,302 (best shown in FIG. 3). A guide assembly 312 guides the carriage assembly 200 into the docking cart 304 to the docked position shown in FIG. 4. A plurality of wheels 314,316 facilitate radial movement of the docking cart 304 about the first and second circumferences 124,128 (FIG. 3) of the generator rotor 118 (FIG. 3), as previously discussed.

A transverse transport assembly 700 is structured to move the carriage assembly 200 back and forth between the first and second motion control modules 300,302, as indicated by arrow 170 of FIG. 3 and as previously described with respect thereto, and a radial transport assembly 800 is structured to move the carriage assembly 200 radially around the first and second circumferences 124,128, as indicated by arrows 190, 192 of FIG. 3. The frame 306 of the docking cart 304 includes a first side 318, a second side 320, a first end 322, and a second end 324. The wheels 314,316 of the example docking cart 304 comprise a plurality of lateral wheels 314 coupled to the first and second sides 318,320 of the frame 306, and a number of guide members 316 coupled to a second end 324 of frame 306, as shown. Both the lateral wheels 314 and the guide members 316 are adjustable with respect to the frame 306 in order to accommodate a variety of circumferences (e.g., first and second circumferences 124,128 of FIG. 3) of the structure (e.g., rotor 118 of FIG. 3) to which the motion control module 300 is movably coupled. It will be appreciated that any known or suitable mechanism for facilitating movement about such structure, other than the lateral wheels 314 and guide members 316 shown and described herein, could be employed without departing from the scope of the invention. The lateral wheels 314 function to engage the retaining ring 132 of the rotor 118 in order to position the frame 306 of the docking cart 304 with respect thereto, such that it does not interfere with the surface of the rotor 118 as the docking cart 304 travels radially around the circumference 124,128 of the rotor 118 in the directions indicated by arrows 190 and 192 of FIG. 3. The guide members 316 function to engage an edge of the retaining ring 132 at the end 122,126 (FIG. 3) of the rotor 118 (FIG. 3) in order to maintain alignment of the docking cart 304 as it travels radially around the circumference 124, 128 (FIG. 3) of the rotor 118 (FIG. 3).

The guide assembly 312 of the exemplary docking cart 304 includes a slide 326 which is coupled to the frame 306 of the docking cart 304 and a catch 328, which is coupled to the slide 326 at or about the second end 324 of the frame 306. This slide 326 permits the carriage assembly 200 (FIGS. 3, 4, 5A and 5B) to smoothly transition as it moves from the generator 104 (FIG. 3) into the frame 306 of the docking cart 304 to the docked position shown in FIG. 4. More specifically, the carriage assembly 200 fits through the slots 330,332,334 of in the frame 306 of the docking cart 304 on slide 326. As it slides into the docking cart 304, side rails 336 of the guide assembly 312 guide it through the slots 330,332,334 until the catch 328 of the guide assembly 312 receives the tail 216 of the carriage assembly 200, as shown in FIG. 4. In this manner, the carriage 200 is guided into proper alignment within the frame 306 until the carriage assembly 200 is properly, completely docked within the docking cart 304. As previously noted, the other motion control module 302 is substantially the same as motion control module 300, but does no receive the carriage assembly 200. Specifically, it uses the same type of motors in the same manner as the first motion control module 300 to pull the carriage assembly 200 and to move, but it has no slots (e.g., slots 330,332,334 of frame 306 of the docking cart 304 of first motion control module 300 of FIG. 7) or guide assembly (e.g., guide assembly 312 of first motion control module 300 of FIG. 7).

The transverse transport assembly 700 of the motion control module 300 includes the first motor 308, which is suitably coupled to the frame 306 of the docking cart 304 of the module 300. The first motor 308 includes a spool 702, and a clutch 704. At least one cable 706 extends between the first motion control module 300 and the second motion control module 302 (FIG. 3), as previously discussed, and is coupled at one end to the spool 702 of the motor 308, and at the other end to the carriage assembly 200 (FIGS. 3, 4, 5A and 5B). More specifically, the tail 216 of the carriage assembly 200 includes a hole 230, as shown in FIGS. 5A and 5B, with the end of the cable 706 of the transverse transport assembly 700 engaging the hole 230 (FIG. 5B) in order to pull the carriage assembly 200 transversely through the generator 104, as shown in FIG. 3. The clutch 704 of the first motor 308 is operable between and engaged mode corresponding to the first motor 308 turning the spool 702 and winding the cable 706, and a disengaged mode in which the spool 702 is free to rotate independent from the first motor 308. The exemplary transverse transport assembly 700 includes a second cable 710 which is attached at one end to the nose assembly 400 of the carriage assembly 200, as shown in FIG. 3, and at the other end to a spool (not expressly shown) of the second motion control module 302, which is substantially similar to spool 702 (FIG. 7) of first motion control module 300 (FIG. 7).

Accordingly, in operation, when the clutch 704 of the first motor 308 of one of the first and second control modules 300,302 is in the engaged mode, the clutch 704 of the first motor 308 of the other one of the first and second control modules 300,302 is in the disengaged mode, in order that the transverse transport assembly 700 may move the carriage assembly 200 toward the motion control module 300,302, which has the clutch 704 engaged. The example of transverse transport assembly 700 further includes an encoder assembly 708 which cooperates with the first motor 308, for example, in order to count the number of windings of the cable 706 as it is wound or leased from the spool 702 of the first motor 308. In this manner, the distance of the carriage assembly 200 (FIG. 3) from at least one of the first and second motion control modules 300,302 (FIG. 3) can be determined, in order to determine the location of the carriage assembly 200 (FIG. 3) within the generator 104 (FIG. 3).

The radial transport assembly 800 of the exemplary motion control module 300 includes a number of first sprockets 802 pivotably coupled to the first side 318 of the frame 306 of the docking cart 304, and a number of second sprockets 804 pivotably coupled to the second side 320 of the frame 306. A chain or a pair of chains 806,808, as partially shown, engage and extend between the first sprockets 802 and second sprockets 804, and around the corresponding first or second circumference 124,128 (FIG. 3) of the first or second end 122,126 (FIG. 3) of the generator rotor 118 (FIG. 3), and the first and second retaining rings 132,134 thereof. The exemplary radial transport assembly 800 further includes a second motor 310 having a drive shaft 810 which is coupled to the first sprockets 802, in order to drive (i.e., rotate) such sprockets 802 and thereby move (i.e., transport) the docking cart 304 and the carriage assembly 200 (FIG. 4) received therein, on the chains 806,808 around the circumference 124 (FIG. 3), as previously described. More specifically, the chains 806,808 are coupled to the retaining ring 132 and extend around the retaining ring 132 up and over the docking cart 304 to hold it in place on the rotor 118, and to engage both sets of sprockets 802,804, as shown in FIGS. 3 and 7. The teeth of the sprockets 802,804 engage the corresponding chains 806,808, allowing the docking cart 304 to move with respect thereto. The chains 806',808' at the second end 126 of the rotor 118 operate in conjunction with second motion control module 302 in much the same manner. Thus, the docking cart 304 is held in engagement with the retaining ring 132 by the chains 806, 808, as the docking cart 304 is driven radially around the ring 132 by motor 310. The sprockets 802,804, in addition to engaging the chains 806,808, respectively, to be radial driven around the retaining ring 132, with respect thereto, also serve to maintain alignment of the docking cart 304 with the chains 806,808 and the retaining ring 132.

The example radial transport assembly 800 further includes an inclinometer 812, which is structured to determine the position of the motion control module 300 on the circumference 124 (FIG. 3) of the first end 122 (FIG. 3) of the generator rotor 118 (FIG. 3). In this manner, the motion control module 300 and the carriage assembly 200 received therein (best shown in FIG. 4) can be accurately positioned from a remote location such as, for example, from the controlling and monitoring station 160 of FIG. 3, without requiring hands-on manual manipulation by an operator.

Accordingly, embodiments of the invention provide not only a reduced-size inspection system 102 which is capable of performing a wide variety of operations on a variety of different power generation equipment (e.g., without limitation, relatively small) (e.g., less than about 100 megawatts) generators, but which also can be fully automated, in order to be controlled from a remote location.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An inspection system for inspecting a generator including a rotor and a stator substantially surrounding said rotor, said rotor having a first end with a first circumference and a second end with a second circumference, said stator including a plurality of stator slots, said inspection system comprising:
   a first retaining ring structured to be disposed at or about the first end of said rotor;
   a second retaining ring structured to be disposed at or about the second end of said rotor distal from said first retaining ring;
   a first motion control module movably coupled to said first retaining ring;
   a second motion control module movably coupled to said second retaining ring, said second motion control module being interconnected with said first motion control module;
   electrical equipment; and a carriage assembly structured to transport at least some of said electrical equipment within said generator and between said first motion control module and said second motion control module, in order to perform an operation on said generator, wherein each of said first motion control module and said second motion control module is structured to receive said carriage assembly and to move around a corresponding one of said first circumference of the first end of said rotor and said second circumference of the second end of said rotor, respectively, in order to align said carriage assembly with a predetermined one of said stator slots of said stator of said generator.

2. The inspection system of claim 1 wherein said carriage assembly comprises:
   a body including a first end, a second end, a first side, a second side, a top, and a bottom,
   a nose assembly pivotably coupled to the first end of said body,
   a tail pivotably coupled to the second end of said body, and
   a track assembly coupled to at least one of the first side of said body and the second side of said body.

3. The inspection system of claim 2 wherein said body of said carriage assembly further comprises a slot guide coupled to one of said top of said body and said bottom of said body; and wherein when said carriage assembly is inserted into said predetermined one of said stator slots, said slot guide engages said predetermined one of said stator slots in order to maintain said carriage assembly in proper alignment with respect to said predetermined one of said stator slots as said carriage assembly moves therethrough.

4. The inspection system of claim 2 wherein said at least some of said electrical equipment which is transported by said carriage assembly includes a number of power cables; wherein at least one of said body of said carriage assembly, said nose assembly of said carriage assembly, and said tail of said carriage assembly includes a groove structured to receive said power cables; and wherein said carriage assembly further comprises a cover coupled to said body in order to secure said power cables within said groove.

5. The inspection system of claim 2 wherein said nose assembly comprises a nose member and camera assembly; wherein said nose member includes a first side, a second side, and a number of drive shafts extending between the first side and the second side; and wherein said camera assembly is movable back and forth on said drive shafts between the first side of said nose member and the second side of said nose member.

6. The inspection system of claim 5 wherein said camera assembly comprises:
   a first case,
   a number of cameras and at least one illuminating device disposed on and supported by said first case,
   a motor including at least one gear which turns around said drive shafts of said nose member, in order to move said camera assembly back and forth thereon, and
   a second case coupled to said first case, said second case being structured to secure and protect at least one of said cameras, said at least one illuminating device, and said motor.

7. The inspection system of claim 6 wherein said cameras comprise a first camera disposed at or about a first end of said first case of said camera assembly, in order to view in front of said carriage assembly, and a second camera and a third camera disposed toward the opposite end of said first case of said camera assembly; wherein said second camera and said third camera are structured to view above and below said carriage assembly, respectively; and wherein said at least one illuminating device comprises a plurality of LEDs coupled to said first case of said camera assembly proximate each of said first camera, said second camera, and said third camera.

8. The inspection system of claim 2 wherein said at least some of said electrical equipment which is transported by said carriage assembly includes an ELCID coil; and wherein said nose assembly further comprises an ELCID holder structured to removably receive said ELCID coil.

9. The inspection system of claim 2 wherein said track assembly comprises:
   a number of track hinges coupled to said body of said carriage assembly,
   a number of gears coupled to said track hinges, and
   at least one tread coupled to said gears,
   wherein said at least one tread is structured to grip said generator, and
   wherein said gears are structured to rotate, thereby turning said at least one tread in order to facilitate movement of said carriage assembly through said generator.

10. The inspection system of claim 9 wherein said track assembly further comprises a number of magnets structured to attract said track assembly and said carriage assembly to said generator.

11. The inspection system of claim 2 wherein said carriage assembly includes a side profile having a height; and wherein the height of said side profile of said carriage assembly is less than about 0.75 inches.

12. The inspection system of claim 2 wherein at least one of said first motion control module and said second motion control module comprises:
   a docking cart including a frame structured to receive said carriage assembly and to move said carriage assembly about said corresponding one of said first circumference of the first end of said rotor on said first retaining ring and said second circumference on said second retaining ring of the second end of said rotor, respectively,
   a number of motors coupled to said frame of said docking cart,
   a guide assembly for guiding said carriage assembly into said docking cart,
   a plurality of wheels for facilitating movement of said docking cart about said corresponding one of said first circumference and said second circumference,
   a transverse transport assembly for moving said carriage assembly back and forth between said first motion control module and said second motion control module, and
   a radial transport assembly for moving said carriage assembly around said corresponding one of said first circumference and said second circumference of the first end and the second end of said rotor of said generator, respectively.

13. The inspection system of claim 12 wherein said frame of said docking cart includes a first side, a second side, a first end, and a second end; wherein said wheels comprise a plurality of lateral wheels coupled to the first side and the second side of said frame of said docking cart, and a number of guide members coupled to the second end of said frame of said docking cart; and wherein said lateral wheels and said guide members are adjustable with respect to said frame of said docking cart in order to accommodate said corresponding one of said first circumference and said second circumference of the first end and the second end of said rotor of said generator.

14. The inspection system of claim 12 wherein said guide assembly of said docking cart comprises a slide coupled to said frame of said docking cart, and a catch coupled to said slide at or about the second end of said frame of said docking cart; wherein said slide permits said carriage assembly to smoothly transition from said generator into said frame of said docking cart; and wherein said catch receives said tail of said carriage assembly in order to guide said carriage assembly into proper alignment within said frame of said docking cart.

15. The inspection system of claim 12 wherein said transverse transport assembly comprises:
 a first motor coupled to said frame of said docking cart and including a spool and a clutch, and
 at least one cable extending between said first motion control module and said second motion control module, said at least one cable being coupled at one end to said spool and at the other end, to said carriage assembly,
 wherein said clutch of said first motor is operable between an engaged mode corresponding to said first motor turning said spool and winding said at least one cable, and a disengaged mode in which said spool is free to rotate independent from said first motor, and
 wherein when said clutch of said first motor of one of said first motion control module and said second motion control module is in said engaged mode, said clutch of said first motor of the other one of said first motion control module and said second motion control module is in said disengaged mode, in order that said transverse transport assembly moves said carriage assembly toward the one of said first motion control module and said second motion control module which has said clutch in said engaged mode.

16. The inspection system of claim 15 wherein said tail of said carriage assembly includes a hole; and wherein one end of said at least one cable of said transverse transport assembly engages said hole in order to pull said carriage assembly through said generator.

17. The inspection system of claim 12 wherein said radial transport assembly comprises:
 a number of first sprockets pivotably coupled to the first side of said frame of said docking cart,
 a number of second sprockets pivotably coupled to the second side of said frame of said docking cart,
 a chain engaging and extending between said first sprockets and said second sprockets, and around said corresponding one of said first circumference of the first end of said generator rotor and said first retaining ring thereof and said second circumference of the second end of said generator rotor and said second retaining ring thereof,
 a second motor including a drive shaft coupled to one of said first sprockets and said second sprockets in order to pivot said one of said first sprockets and said second sprockets, thereby turning said chain and moving said docking station and said carriage assembly received therein, around said corresponding one of said first circumference of the first end of said generator rotor and said second circumference of the second end of said generator rotor.

18. The inspection system of claim 12 wherein at least one of said first motion control module and said second motion control module further comprises at least one of an encoder assembly for said transverse transport assembly, and inclinometer for said radial transport assembly; wherein said encoder assembly is structured to determine the distance of said carriage assembly from said at least one of said first motion control module and said second motion control module, in order to determine the location of said carriage assembly within said generator; and wherein said inclinometer is structured to determine the position of said at least one of said first motion control module and said second motion control module on said corresponding one of said first circumference of the first end of said generator rotor and said second circumference of the second end of said generator rotor.

19. The inspection system of claim 1 wherein said generator has an iron core; wherein said electrical equipment is selected from the group consisting of cameras, ELCID coils, LEDs, motors, sensors, and transmitters; and wherein said operation performed on said generator includes at least one of: (a) an inspection of at least said predetermined one of said stator slots of said stator of said generator, and (b) an analysis of said iron core of said generator.

20. The inspection system of claim 1 wherein said electrical equipment includes a controlling and monitoring station; and wherein said controlling and monitoring station is in electrical communication with said first motion control module, said second motion control module, and said carriage assembly, in order to perform said operation on said generator from a remote location.

* * * * *